Figure 1:
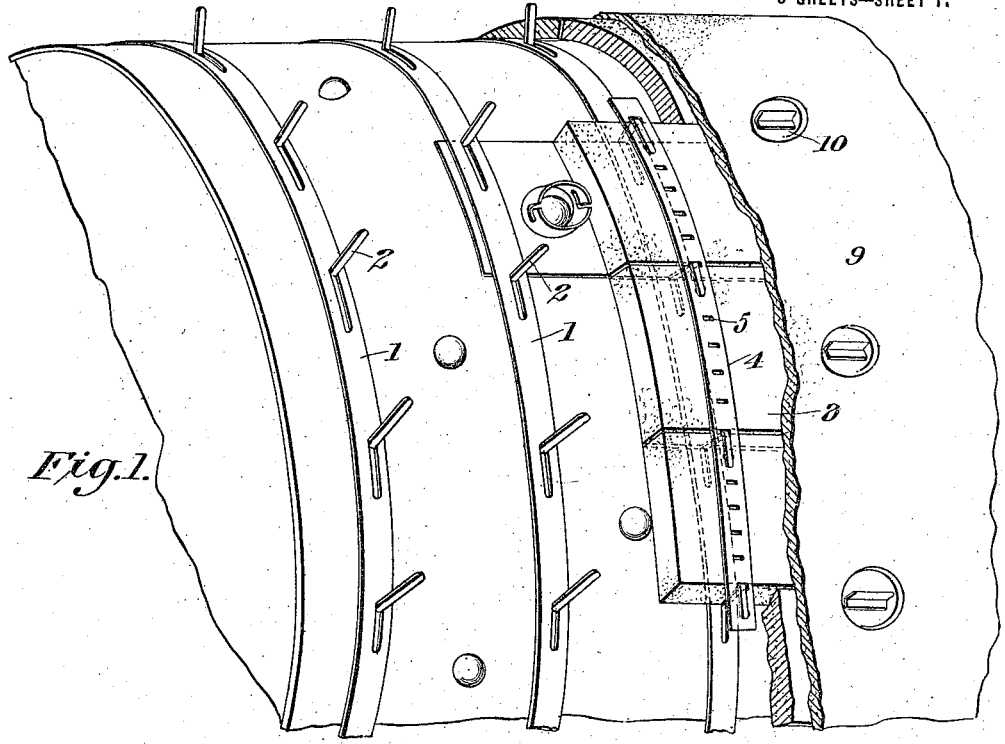

I. D. SIEGFRIED.
HEAT INSULATING COVERING.
APPLICATION FILED APR. 14, 1917.

1,251,830.

Patented Jan. 1, 1918.
3 SHEETS—SHEET 1.

Inventor
Ira D. Siegfried
by
Attorney

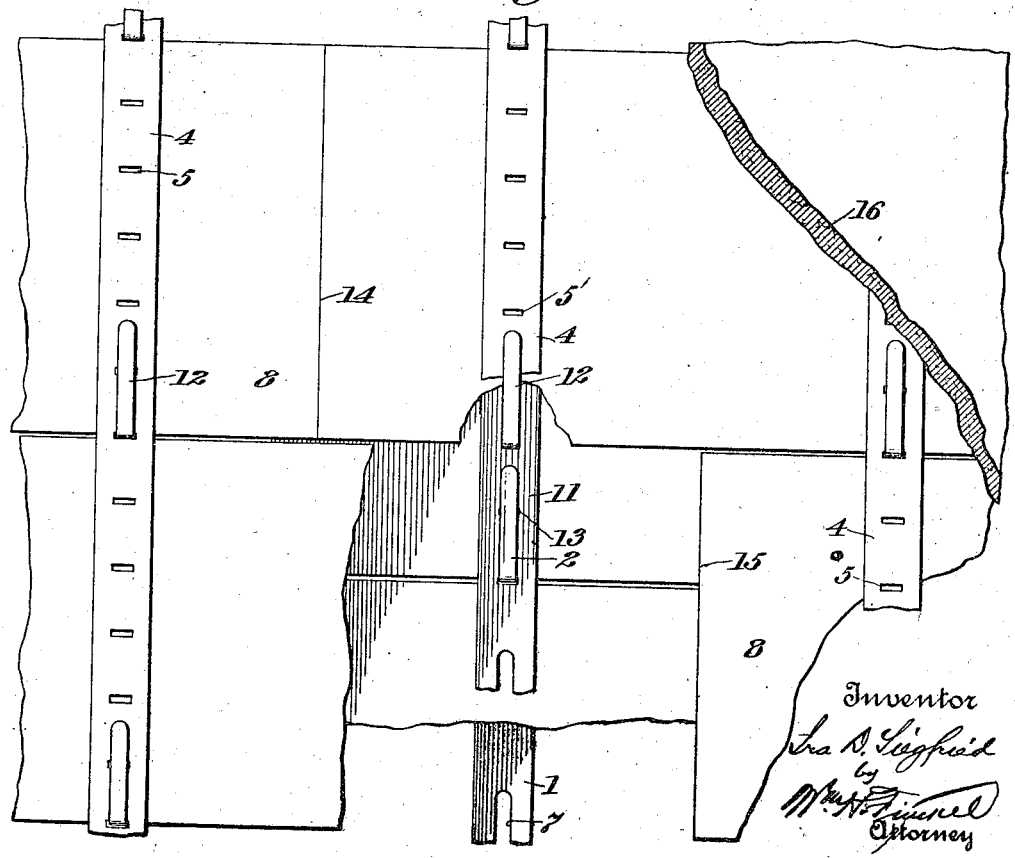

I. D. SIEGFRIED.
HEAT INSULATING COVERING.
APPLICATION FILED APR. 14, 1917.
1,251,830.
Patented Jan. 1, 1918.
3 SHEETS—SHEET 3.
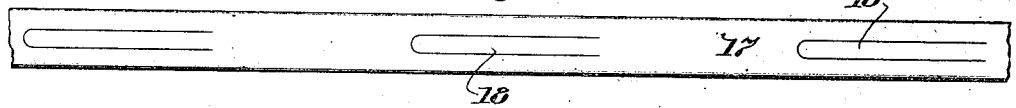
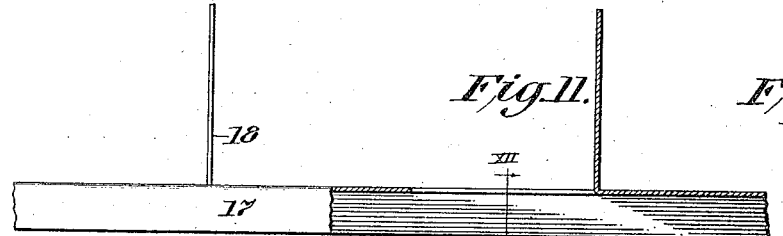 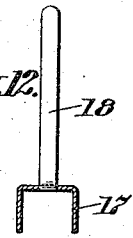
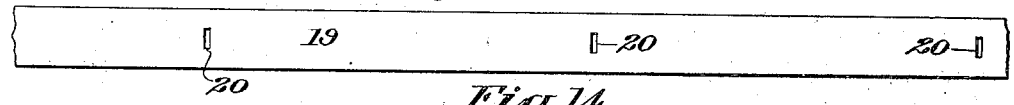
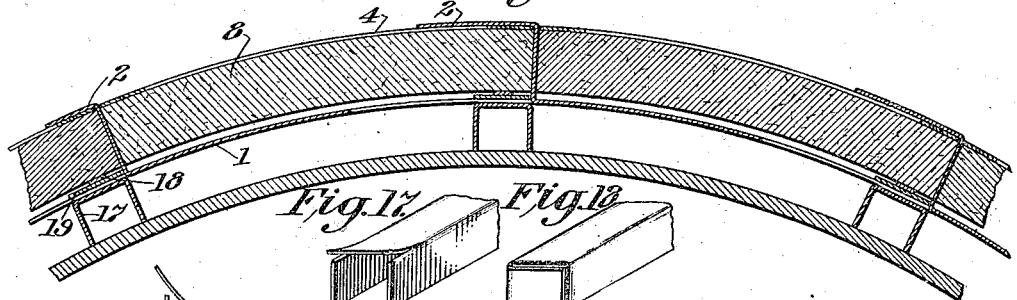
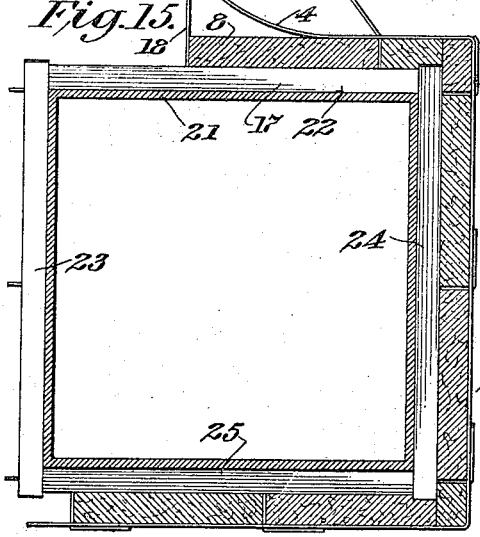 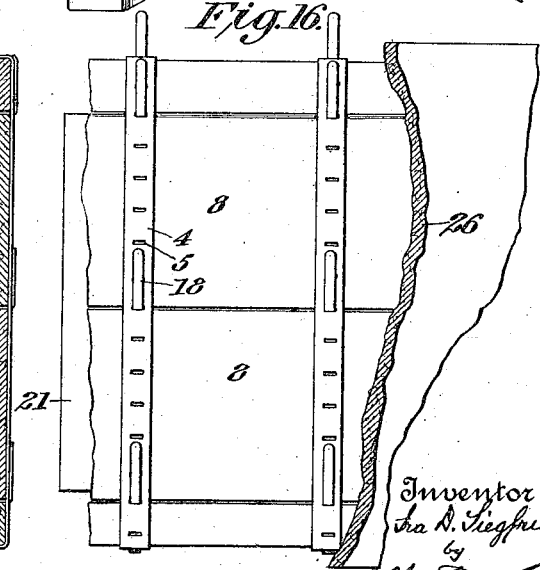
Inventor
Ira D. Siegfried
by
Attorney

UNITED STATES PATENT OFFICE.

IRA D. SIEGFRIED, OF CLEVELAND, OHIO.

HEAT-INSULATING COVERING.

1,251,830.  Specification of Letters Patent.  Patented Jan. 1, 1918.

Application filed April 14, 1917. Serial No. 162,048.

*To all whom it may concern:*

Be it known that I, IRA D. SIEGFRIED, a citizen of the United States, residing at Cleveland, in the county of Cuyahoga and State of Ohio, have invented a certain new and useful Improvement in Heat-Insulating Coverings, of which the following is a full, clear, and exact description.

Heat insulating coverings commonly applied to boilers and the like, especially those coverings which are formed of a series of blocks of material that is a non-conductor of heat, such as magnesia, are at present usually applied by stretching ropes or wires around the boiler or other structure to be covered and connecting their ends with some sort of spring device for keeping the ropes or wires in close contact with the structure, and then slipping the blocks under these ropes or wires, edge to edge, until the entire structure is surrounded with the blocks. Then wires are fastened around the blocks, and tightened, in order to hold them in permanent fixed position, the whole being then covered with an outside layer of asbestos cement, or similar plastic material, which serves the purpose of filling the interstices between the blocks and gives the completed covering a symmetrical and pleasing appearance.

This mode of applying heat insulating coverings is attended by various difficulties and disadvantages. For example, when the blocks are placed upon the structure under the retaining ropes or wires they have a tendency to slip around toward the bottom and get out of alinement, and this requires constant adjustment during their application. Moreover, when the permanent retaining wires are placed around the structure and tightened, they have a tendency to cut into the soft material, of which the blocks are formed, and thus impair the durability of the blocks. Furthermore, it often becomes necessary to remove a part of the covering for inspection of the structure beneath, particularly in the case where such coverings are applied to boilers where periodic inspection of the boiler stay bolts is required.

The object of this invention is to provide for applying coverings to boilers and the like, eliminating the disadvantages above enumerated and making the application of a covering to a structure rapid, economical and permanent, and obviating the necessity for any kind of temporary or preliminary retaining device during the application of the covering. Moreover, by my invention, injury to the covering material is eliminated; and when the covering is completed, sections or blocks may be removed for inspection without destruction of the blocks, thus permitting their being replaced intact. This is not possible, so far as I know, with coverings as at present applied.

The invention consists in supporting bands or strips, preferably of sheet metal, such as strap-iron or steel or brass, having tongues or projections adapted to extend outwardly between the blocks, and retaining bands having slots, adapted to coact with the tongues of the first-mentioned bands, spaced at suitable intervals apart, the tongues of said first-mentioned bands being extended through the slots and bent over upon the retaining bands to thus lock the blocks between the two bands, and hold them in proper alinement and adjustment upon the structure covered.

The invention further provides for the installation of coverings where a multiple course of blocks is used.

The invention also provides for coverings wherein an air space is used between the structure and the heat insulating material, as on some boilers and tanks, and particularly on the breechings of smoke connections.

Figure 2:
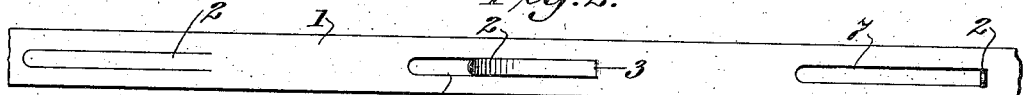
Figure 3:
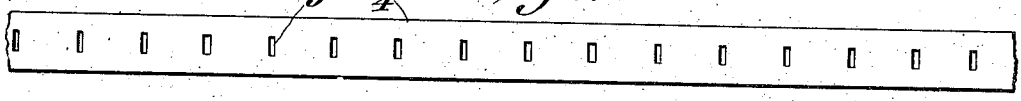
Figure 4:
Figure 5:
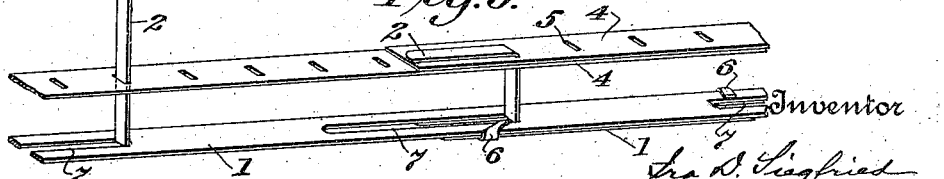

In the accompanying drawings illustrating the invention, in the several figures of which like parts are similarly designated, Figure 1 is a perspective view of a portion of an ordinary steam boiler, showing the various stages of construction of the heat insulating covering thereon. Fig. 2 is a top plan view of a portion of one of the tongued supporting strips. Fig. 3 is a top plan view of a portion of one of the strips of the retaining band. Fig. 4 is a transverse section of a portion of the covering assembled. Fig. 5 is a perspective view showing the method of forming a joint with the strips of both bands. Fig. 6 is a top plan view of a portion of a strip adapted for use in multiple-course covering construction. Fig. 7 is a transverse sectional view, and Fig. 8 is a top plan view illustrating the method of applying a multiple-course covering, in this case two courses being shown. Fig. 9 is a fragmentary perspective view showing the method of attaching the various bands in a double-course construction. Fig. 10 is a top plan view of a strip formed of channel material, for use in coverings where an air space is desirable. Fig. 11 is a partial longitudinal sectional elevation, and Fig. 12 is a transverse section taken on the line XII—XII of Fig. 11, of the strip shown in Fig. 10. Fig. 13 is a top plan view of a portion of a flat tie strip used with the channel strip of Figs. 10, 11 and 12. Fig. 14 is a transverse section of a portion of a boiler and its covering between which an air space is provided. Figs. 15 and 16 are respectively a transverse section and a sectional elevation on a smaller scale, illustrating my invention as applied to a breeching. Figs. 17 and 18 are detail perspective views showing the method of forming a socket end on the channel strips.

Referring to Figs. 1, 2, 3, 4 and 5, the supporting strips 1 are preferably formed of sheet or strap steel, about three-quarters of an inch wide and one thirty-second of an inch thick. At intervals of about six inches tongues or projections 2 are stamped out of this strip and adapted to be bent up at 3, to a position substantially perpendicular to the body of the strip. The retaining strips 4 may be of like material and width and thickness as the strips 1, and are provided at intervals of about one inch with slots 5 adapted to coact with the tongues 2 of the strips 1. When it is necessary to unite the ends of two of the strips 1, the splicing may be accomplished as shown in Fig. 5, by cutting a supplemental tongue 6 at one end of each of the strips to be united and passing each of these tongues through an opening 7 and bending the tongues around laterally so as to hold the pieces firmly together, the tongues 6 being so positioned with respect to the ends of the openings 7 that lengthwise movement in either direction is prevented.

In applying a single-course covering to a boiler using the invention as thus far explained, a number of strips 1 are spliced together, as described, to form a band of sufficient length to completely encircle the boiler, the meeting ends of this band being joined and the band tightly clamped about the boiler shell, so as to be incapable of accidentally slipping around. These bands are placed at intervals of about eight inches along the full length of the boiler. The tongues of the bands are then bent up, so as to project radially from the bands, and then the blocks 8 are laid on, starting at any point desired. The blocks in common use are of about six inches in breadth, and therefore snugly fit between the tongues, and as the blocks are laid the retaining bands 4 are applied on their outer surfaces with the tongues 2 engaging the slots 5 and the ends of the tongues are bent over, to thereby clamp the blocks between the bands 2 and strips 4 and hold them rigidly and securely in position. When the boiler is completely covered with the blocks 8, a coating 9 of asbestos cement, or similar plastic material, is applied over the whole covering.

As inspection of stay-bolts on all boilers is required periodically, stay-bolt inspection ports 10 are provided over all the stay-bolts, substantially as indicated in Fig. 1. These inspection ports are fully described in my case filed of even date herewith, and will not, therefore, be described in detail here.

Referring to Figs. 6, 7, 8 and 9, in which a double-course construction of covering is shown, a strip 11 having tongues 12 is used between the courses, as will be presently described, and this strip has slots 13 between the tongues and spaced preferably about an inch apart, for a purpose hereinafter appearing.

In assembling a covering of this last described character, or one in which there are more than two courses, bands are made of the strips 1 of sufficient length to completely encircle and tightly embrace the boiler, as in the single course construction first described, and the blocks 8 are laid upon these bands between the outwardly projecting tongues 2. Then the strips 11 are so placed upon the outer surface of the covering of blocks as to have their slots 13 engage the tongues 2, the tongues 2 then being bent over so as to establish a union between the bands and the strips 11 and hold the first course of blocks in fixed relation to the boiler. The tongues 12 of the strips 11 are then bent up so as to project substantially radially, and a second course of blocks is laid upon the first course and between the outwardly projecting tongues 12, and then strips 4 are applied to the outer surface of this second course of blocks with their slots 5 engaging the tongues 12, and these tongues 12 are then bent over to establish a union between the strips 11 and 4 and in this manner hold the second course of blocks in fixed and permanent relation to the first course.

It is obvious that by substituting strips 11 for strips 4, the number of courses of blocks may be increased to any extent desired.

When this double or multiple course construction is used, the longitudinal joints of the blocks of the two courses are staggered with relation to each other, as shown in Figs. 7 and 8. Moreover, the abutting ends of the blocks may break joints as shown at 14 and 15 in Fig. 8. This breaking of the joints of the blocks may also be accomplished in the single course construction first described.

As in the case of the single course construction, when the multi-course covering of blocks is completed, a layer of asbestos cement 16 or other similar plastic composition may be applied to the outside of the blocks to fill the interstices between the blocks and provide a smooth and attractive finish to the covering.

Sometimes it is desirable to so apply a covering to a boiler or other structure that the covering may stand away from the structure in order to form an air space between the two, and to this end I provide a covering-applying strip 17 formed of channel section material (shown in Figs. 10, 11 and 12), having tongues 18 stamped or otherwise formed from its web surface, and for co-operation with these strips in applying a covering to a circular structure, I provide tie strips 19 having slots 20 adapted to co-act with the tongues 18 for a purpose hereinafter appearing.

In applying a covering in which an air space is used, the strips 17 are applied longitudinally of the boiler, and for its full length, the tongues 18 having been previously bent up to a perpendicular position, as shown in Figs. 11 and 12, and then strips 1, such as shown in Fig. 2, and having their tongues bent up perpendicularly are applied so as to encircle the boiler and rest upon the upper or web surface of the strips 17. Then the tie strips 19 are applied to the tongues 18 of the strips 17 and the tongues 18 bent down so as to securely clamp the strips 1 between the tie strips 19 and channel strips 17, and these channel strips will be prevented from slipping around the boiler by the fact that the tie strips 19 abut against the tongues 2 of the strips 1, as clearly shown in Fig. 14. The blocks of heat insulating material 8 are then applied as hereinabove described.

When it is desired to apply a heat insulating covering to a breeching, such as the breeching used in smoke connections, an air space between the covering and the breeching is nearly always desirable. In this connection my strips 17 are useful. In order to apply a covering of this character to a square breeching, such as shown at 21 in Fig. 15, I take four of the strips 17 and cut them to the proper length to form a square around the four sides of the breeching, and by cutting their ends as shown in Fig. 17, and folding these cut ends over upon each other as shown in Fig. 18, I form socket ends on the strips by which a practically unitary channel member is formed around the breeching, as shown in Fig. 15, the ends of the top piece 22 supporting the side pieces 23 and 24 and they in turn supporting the bottom piece 25. Then the tongues 18 may be bent up and the blocks and retaining bands applied as described with reference to the single course covering construction shown in Figs. 1 to 5, inclusive, and the whole finally covered with a layer of asbestos cement or other similar plastic material 26, as in the other applications of my invention hereinbefore described.

The strips provided with tongues are made in suitable short lengths, and may be fastened together to form a continuous band of any desired length. The retaining strips are also made of short lengths and when applied may have their ends overlapped so as to form in effect a continuous band, and it is obvious that with such a construction portions of the retaining band may be removed and the blocks thereunder likewise removed for inspection purposes. Furthermore, in a covering applied in the manner herein described, the blocks may be staggered so as to break joints, thereby lending strength and permanence to the covering and avoiding the continuous transverse slits which are present in coverings as at present applied, and which are apt to cause cracks to appear in the outside coating of asbestos cement.

Although the invention is described and claimed as primarily applicable to boilers, it is obvious that it may be used for a variety of purposes, and is intended to be so claimed.

Variations in details of construction and arrangement of parts are to be understood as being within the spirit of the invention and the scope of the appended claims.

What I claim is:—

1. A heat insulating covering for boilers and the like, comprising heat insulating material, means engaging the article to be covered provided with projections, and means engaging said heat insulating material and coacting with said projections to hold the insulating material on said article.

2. A heat insulating covering for boilers and the like, comprising heat insulating material in sections and means to support said sections on a boiler when assembling and after being assembled, composed of a boiler encircling supporting band provided with means adapted to project between said sections and upon which the sections are mounted, and a superposed retaining band fixedly engaging said projections to thereby hold said insulating material on the boiler.

3. A heat insulating covering for boilers and the like, comprising heat insulating material in sections and means to support said sections on a boiler when assembling and after assembling, composed of a tongued supporting band upon which the sections are mounted, and a superposed retaining band coacting with the tongues on said supporting band to thereby hold said insulating material in fixed relation to the boiler.

4. A heat insulating covering for boilers and the like, comprising heat insulating material in sections and means to support said sections on a boiler when assembling and after assembling, composed of a supporting band provided with tongues, and a retaining band having means to engage said tongues to hold the insulating material between them in fixed relation to the boiler.

5. A heat insulating covering for boilers and the like, comprising heat insulating material in sections and means to support said sections on a boiler when assembling and after assembling, composed of a sectional boiler encircling supporting band provided with tongues so spaced as to receive the sections of insulating material between them, and a retaining band provided with slots to engage said tongues to fixedly support said sections between them and on said boiler.

6. A heat insulating covering for boilers and the like, comprising heat insulating material in blocks, strips having integral tongues bent up therefrom and spaced at intervals of substantially the width of said blocks, said strips adapted to be united end to end to form supporting bands upon which said blocks are laid between the tongues, and retaining strips having slots adapted to coact with said tongues to clamp the blocks between said supporting bands and retaining strips and hold them in fixed relation to the boiler, the whole being covered with a finish coating of plastic material.

7. In a heat insulating covering for boilers and the like, bands encircling the boiler and having tongues, non-heat conducting material mounted on and supported by said bands, and retaining bands applied to said non-conducting material and coacting with said tongues for removably supporting said material upon the boiler.

8. In a heat insulating covering for boilers and the like, strips provided with tongues and united to form a boiler encircling supporting band, blocks of non-heat-conducting material adapted to fit between said tongues, and strips adapted to encircle said blocks and having slots adapted to coact with said tongues to clamp the blocks between said tongued strips and slotted strips and thereby hold them in fixed relation to the boiler.

9. In a heat insulating covering for boilers and the like, supporting bands encircling the boiler and arranged at suitable intervals throughout its length, tongues on said bands, blocks of non-heat-conducting material laid on said bands and supported between said tongues, retaining bands encircling said blocks and having means to engage said tongues whereby said retaining bands may be fixed with relation to the blocks and the blocks thereby held in position on the boiler.

10. In a heat insulating covering for boilers and the like, the combination with blocks of non-heat-conducting material, of supporting means applied to the boiler and having tongues, and retaining means applied to said blocks and coacting with the tongues of said supporting means to retain said blocks in fixed relation to the boiler, and means coacting with said supporting means for providing an air space between said boiler and covering.

11. In a heat insulating covering for boilers and the like, the combination with blocks of non-heat-conducting material, of supporting bands applied to the boiler and having tongues, retaining bands applied to said blocks and having slots adapted to coact with said tongues to hold the blocks in fixed relation to the boiler, and a coating of plastic material applied to the whole.

In testimony whereof I have hereunto set my hand this tenth day of April A. D. 1917.

IRA D. SIEGFRIED.

Witnesses:
ROSCOE M. EWING,
PHOEBE M. BERRY.

Copies of this patent may be obtained for five cents each, by addressing the "Commissioner of Patents Washington, D. C."